(12) United States Patent
Nadherny et al.

(10) Patent No.: US 6,402,446 B1
(45) Date of Patent: Jun. 11, 2002

(54) LADING TIE ANCHOR SYSTEM

(75) Inventors: Rudolph E. Nadherny, Golden, MO (US); Mark Kampf, Crystal Lake, IL (US)

(73) Assignee: Ireco, Inc., Chicago, IL (US)

( * ) Notice: Subject to any disclaimer, the term of this patent is extended or adjusted under 35 U.S.C. 154(b) by 0 days.

(21) Appl. No.: 09/447,133

(22) Filed: Nov. 22, 1999

(51) Int. Cl.$^7$ .................................................. B60P 7/08
(52) U.S. Cl. ........................ 410/100; 410/97; 410/117; 410/118; 410/113; 410/114; 410/115
(58) Field of Search .......................... 410/96, 97, 100, 410/117, 118, 104, 116, 113, 114, 115; 24/68 CD, 265 CD, 301, 302; 248/499

(56) References Cited

U.S. PATENT DOCUMENTS

| | | | | |
|---|---|---|---|---|
| 2,170,913 A | * | 8/1939 | Rowe | 410/117 |
| 2,226,667 A | * | 12/1940 | Love | 410/114 |
| 2,716,382 A | | 8/1955 | Johnson | |
| 2,753,816 A | * | 7/1956 | Oakley | 410/114 |
| 2,803,201 A | | 8/1957 | Johnson et al. | |
| 2,882,837 A | * | 4/1959 | Methe et al. | 410/114 |
| 2,939,406 A | * | 6/1960 | Wilkoff | 410/115 |
| 3,089,436 A | | 5/1963 | Buckley | |
| 3,179,068 A | | 4/1965 | Jensen | |
| 3,224,385 A | * | 12/1965 | Elsner | 410/117 |
| 3,831,532 A | | 8/1974 | Smith et al. | |
| 3,958,516 A | * | 5/1976 | Cheung | 410/115 |
| 4,168,667 A | * | 9/1979 | Loomis | 410/118 |
| 4,266,897 A | | 5/1981 | Jensen | |
| 5,173,996 A | * | 12/1992 | Chou | 24/68 CD |
| 5,855,045 A | * | 1/1999 | Miura | 24/68 CD |
| 5,934,849 A | * | 8/1999 | Haire | 410/113 |
| 6,030,158 A | * | 2/2000 | Tatina et al. | 410/100 |

\* cited by examiner

*Primary Examiner*—Stephen T. Gordon
(74) *Attorney, Agent, or Firm*—Cook, Alex, McFarron, Manzo, Cummings & Mehler, Ltd.

(57) ABSTRACT

A lading tie anchor system for railway box cars which uses lading ties comprising straps of woven webbing with a hook on one end in place of lading ties in the form of one-time useable steel strapping. The new system makes use of the lading tie anchors already installed in many box cars as well as those installed in newly built box cars. In addition to the novel lading ties a slack take-up and tension buckle is used to join the otherwise free or unanchored ends of each pair of lading ties. Preferably the buckles have a handle-crankable ratchet on one end to which the unanchored end of one of the installed ties is adjustably attached while the unanchored end of the other lading tie is threaded over a pair of take-up rollers mounted on the opposite end of the buckle in such a way that this second lading tie can be manually drawn taut. Thereafter the ratchet is operated to remove any remaining slack in the lading ties and then apply the desired tension thereon. If the pairs of the lading ties are to be re-used in the same box car, web support clips may be inserted in the lading tie anchors located in the doorway posts and used to neatly support the free ends of the lading ties off the car floor and ready for re-use.

20 Claims, 5 Drawing Sheets

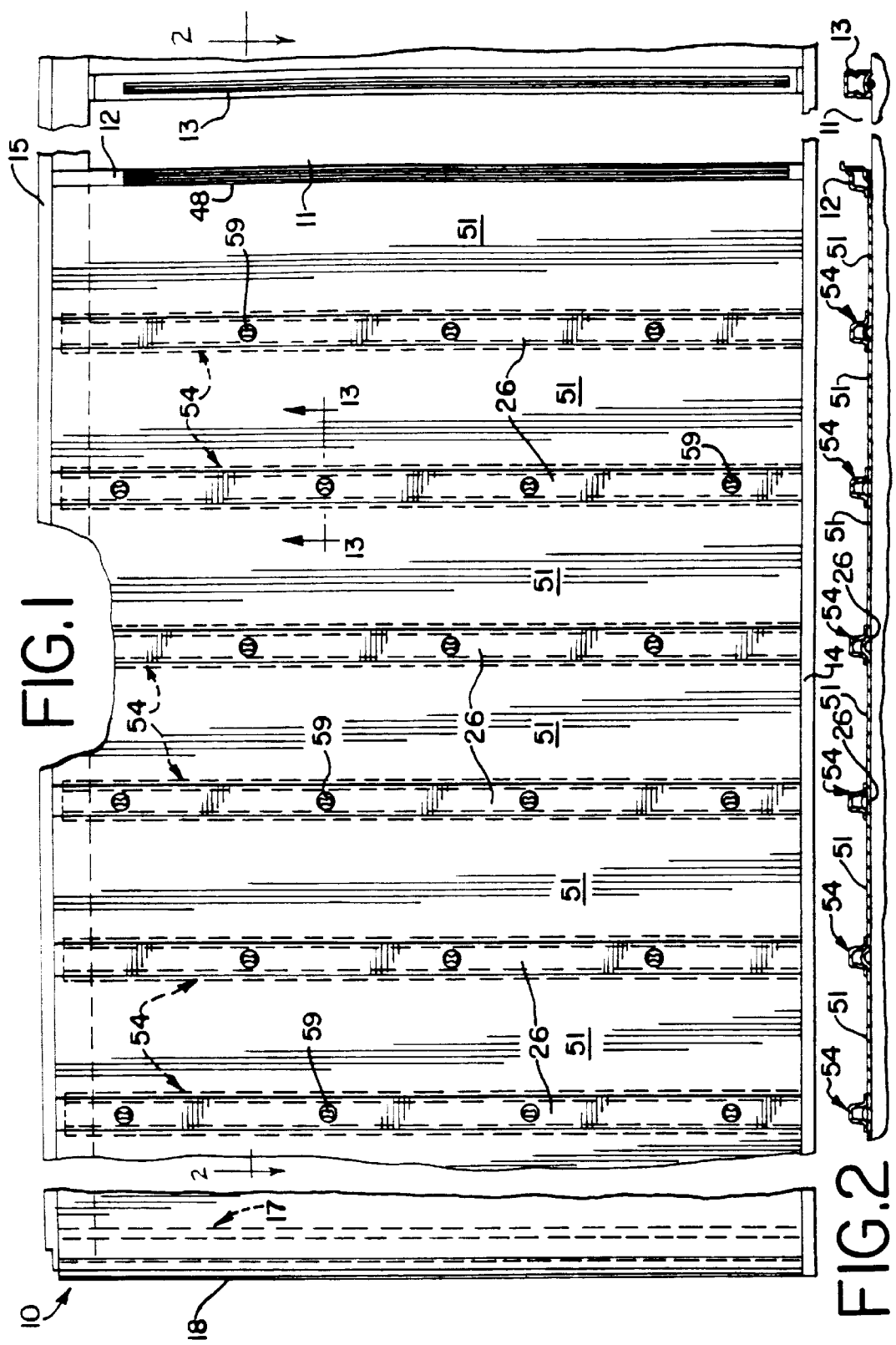

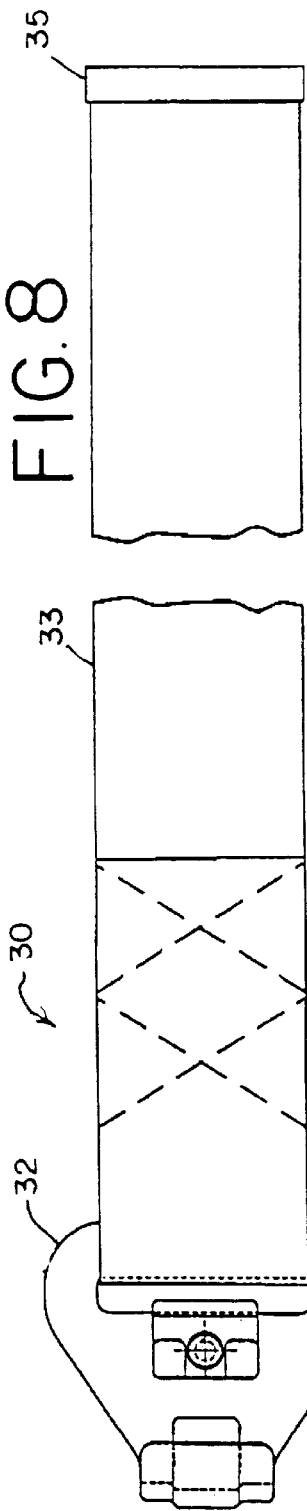
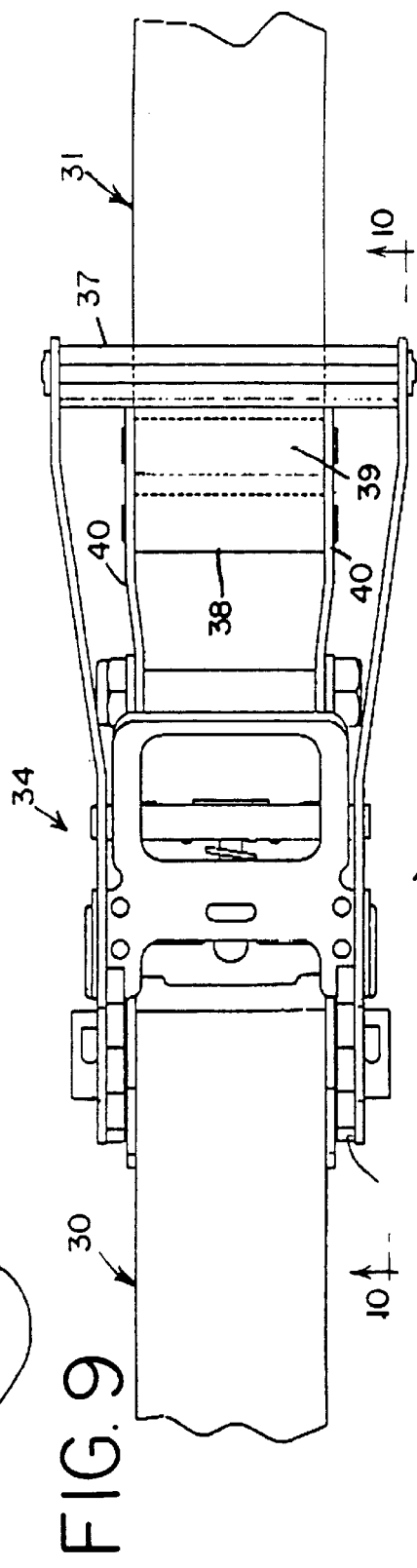
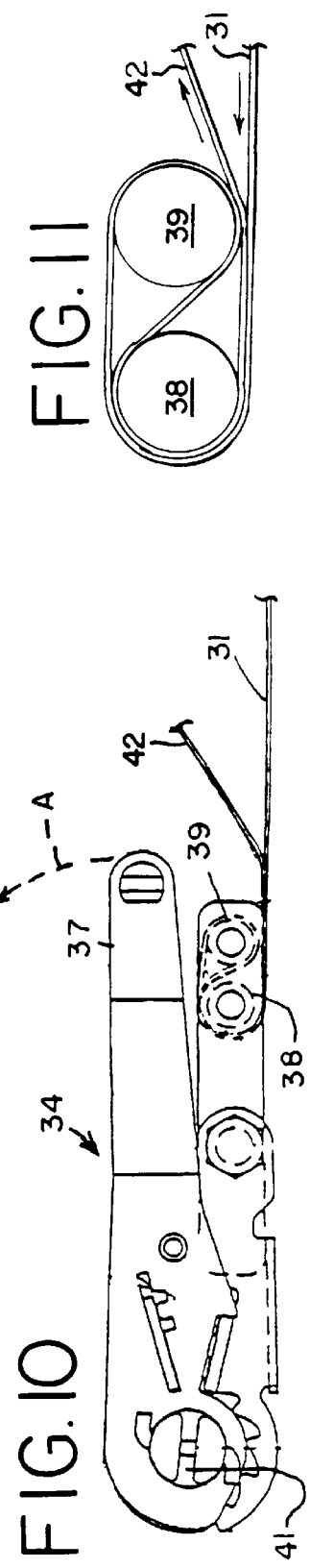
FIG. 8
FIG. 9
FIG. 10
FIG. 11

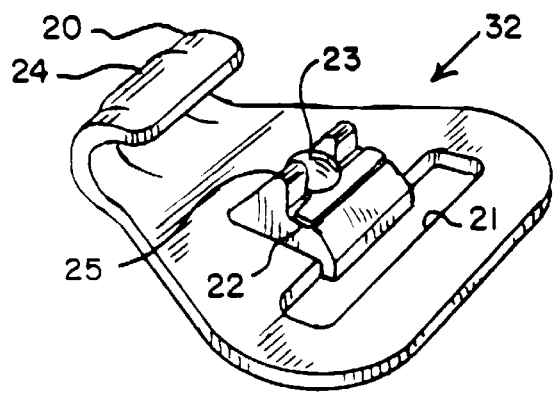
FIG. 12
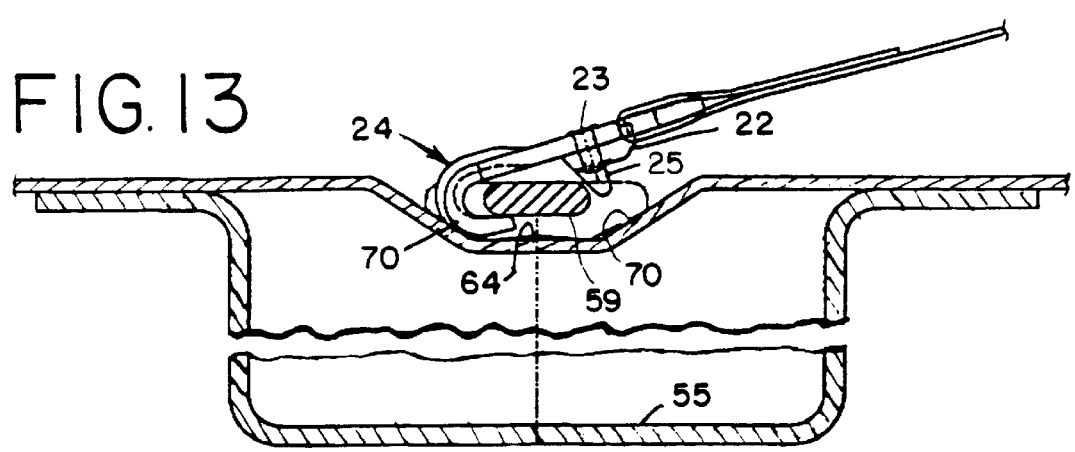
FIG. 13
FIG. 14
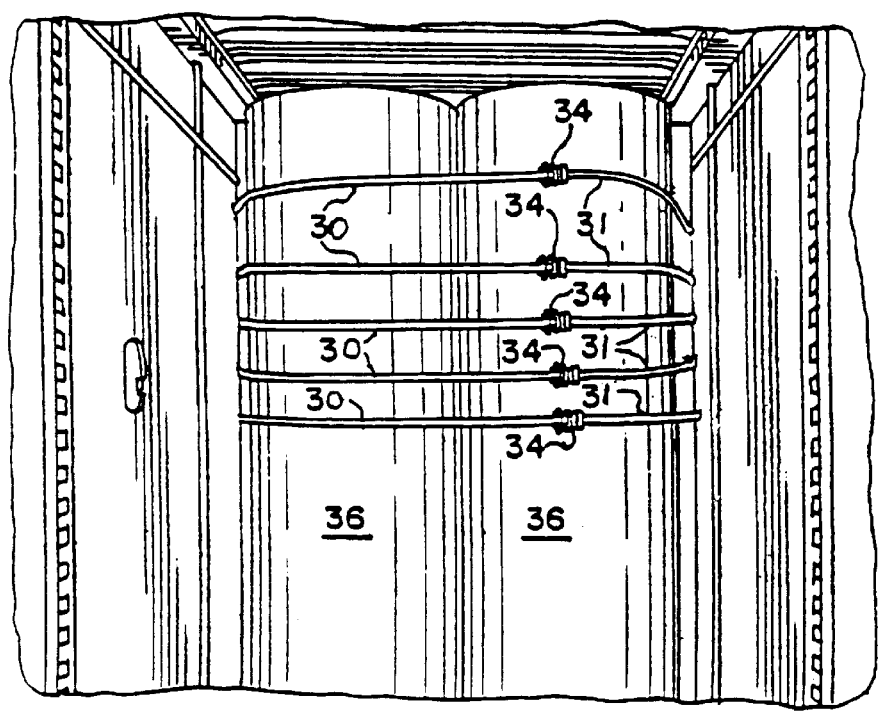

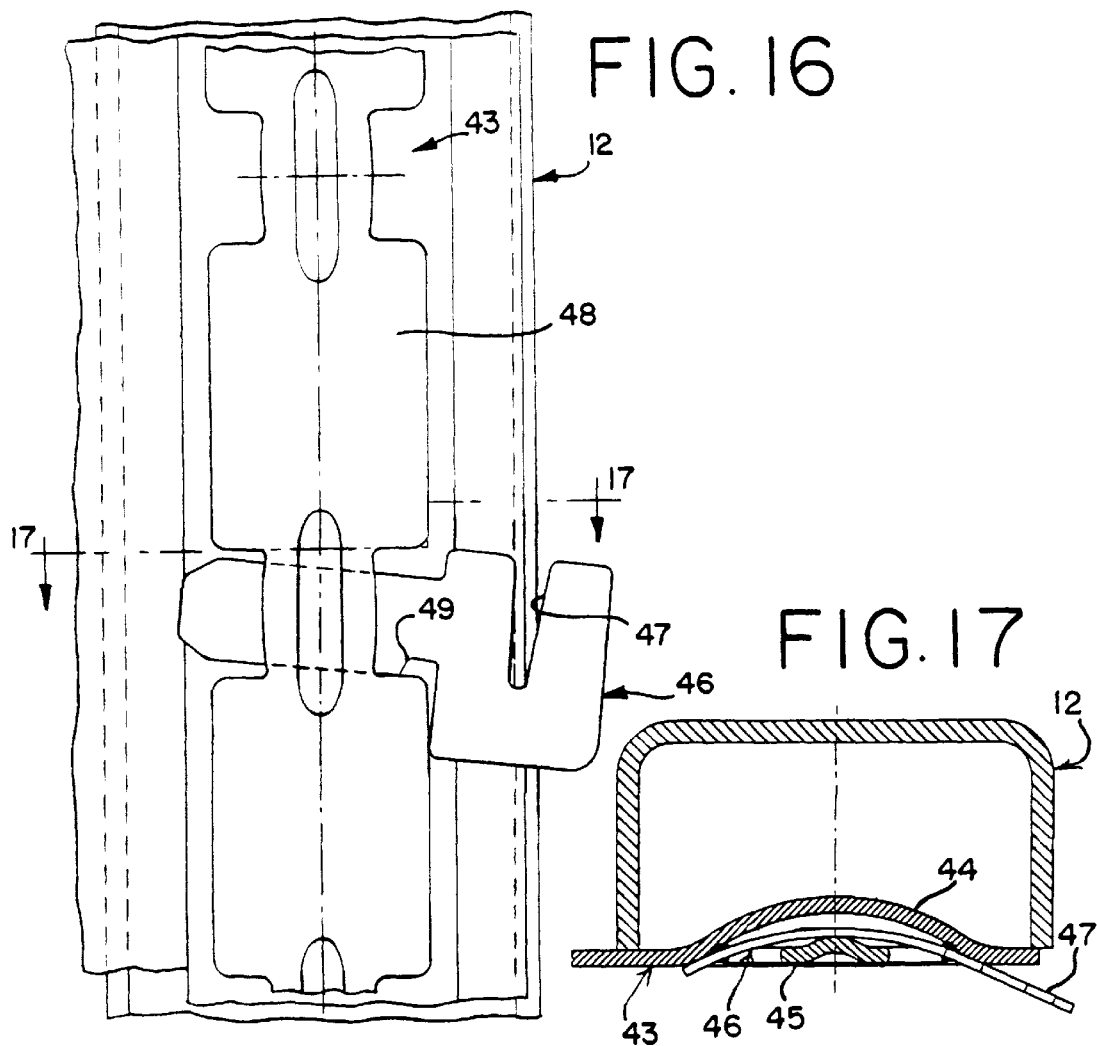
FIG. 16
FIG. 17
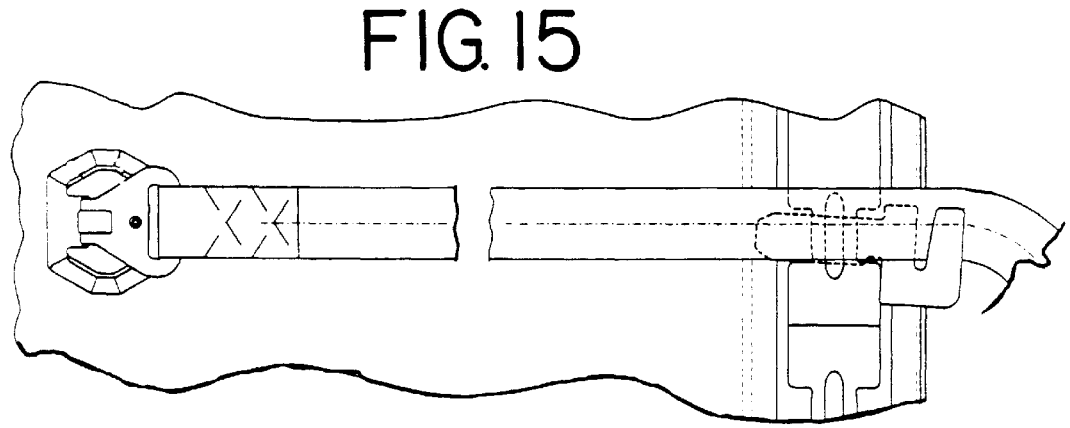
FIG. 15

(1)

LADING TIE ANCHOR SYSTEM

BACKGROUND AND DESCRIPTION OF THE INVENTION

This invention relates generally to improvements in lading tie anchor systems for railway box cars. More particularly, it relates to such systems which are integrated with the lading tie anchors already installed in the side walls of a large number of railway box cars. Heretofore, it has been the practice to utilize steel bands or straps in connection with such existing lading tie anchors so as to restrain cargo in place. The steel straps or bands have a tendency to cut into the cargo such as rolls of paper stood on end. Further, the steel bands or straps are good for one time use only and then become scrap which has to be disposed of.

The object of the present invention, generally stated, is the provision of a lading tie anchor system and method of using the same which makes use of the lading tie anchors already installed in numerous box cars and displaces steel straps or bands as the lading ties with reusable ties formed of webbing in pairs of separate pieces. Each piece of each pair will have a hook formation on one end by which it may be removably attached to a lading tie anchor in the side wall and the free ends of the pieces of each pair will be attachable to one side of a slack take-up buckle having the capability of taking up the slack and then applying tension to a joined pair of ties.

A further object of the invention is the provision of inexpensive webbing tie support clips by which the free ends of ties may be supported off the floor when temporarily not in use.

Certain other objects of the invention will become apparent in view of the following description taken in conjunction with the accompanying drawings.

BRIEF DESCRIPTION OF THE DRAWINGS

FIG. 1 is a view from the inside of a freight car, partly broken away, showing a vertical plan of one part of the car side wall including the doorway on the right and a portion of the end wall on the left;

FIG. 2 is a horizontal sectional view taken generally along line 2—2 of FIG. 1;

FIG. 8 is a fragmentary view showing a lading tie with a hook attached to one end for attaching one end of the tie to a lading tie anchor of FIG. 3;

FIG. 9 is a plan view of a slack take-up buckle showing attached to opposite sides thereof the unanchored ends of a pair of co-acting lading ties of FIG. 8;

FIG. 10 is a side elevational view on reduced scale taken on line 10—10 of FIG. 9;

FIG. 11 is a diagrammatic view showing how the end of the right hand lading tie in FIGS. 9 and 10 is attached to the buckle;

FIG. 12 is a perspective view of the hook shown in FIG. 8 on the end of the lading tie shown therein;

FIG. 13 is a view on enlarged scale taken on line 13—13 of FIG. 1 showing in side elevation the hook on one end of a lading tie of FIG. 8 attached to a lading tie anchor of FIG. 3 in the car side wall;

FIG. 14 is a vertical elevational view looking crosswise on the interior of the freight car of FIG. 1 and showing a cargo of rolls of paper stacked on their ends and restrained in place by five co-acting pairs of the lading tie of FIG. 8 and a buckle of FIG. 9 with one tie of each pair hooked to a lading tie anchor in one side wall while the co-acting lading tie is hooked to the directly opposite lading tie anchor in the opposite wall.

FIG. 15 is a fragmentary elevational view on enlarged scale of the upper right hand portion of FIG. 1 within the broken line enclosure and showing the unanchored end of a lading tie supported by a clip inserted in a car doorway post lading tie anchor;

FIG. 16 is a fragmentary elevational view on enlarged scale showing the lading tie anchor of FIG. 15 with the inserted lading tie support clip; and FIG. 17 is a fragmentary sectional view taken on line 17—17 of FIG. 16.

Referring to FIGS. 1 and 2, a portion of the interior wall of a freight box car is indicated generally at 10 with a door opening 11 at the right which is located between upstanding metallic door posts 12 and 13. The wall 10 extends upwardly from a floor 14 to a top 15. Intermediate metallic car side posts 54—54 are positioned in spaced relation along the wall 10 between the door post 12 and a metallic corner post 17 to which an end wall section 18 is joined at a right angle to the side wall.

In a typical structure, a generally closed arrangement will be provided. Metallic closure plates 26 overlie intermediate side posts 54 in this embodiment which is illustrated in FIGS. 1 and 2.

Figure 4:
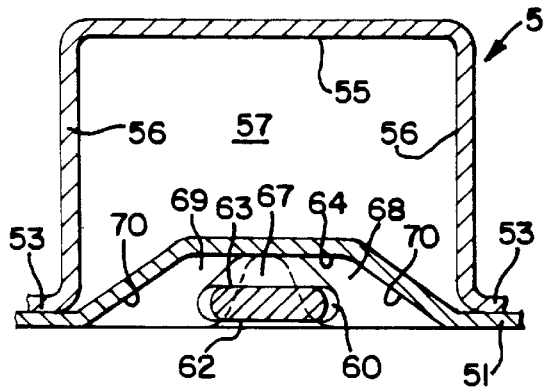
FIG. 4 is a horizontal section taken on line 4—4 of FIG. 3.

Referring to FIG. 4, each intermediate metallic car side post 54 is generally channel shaped or hat shaped in cross section. The side post 54 has a flat rear wall 55 and side walls 56 the distal ends of which have out-turned flanges 53. It is conventional to form the car side posts 54 of $\frac{3}{16}$–$\frac{1}{4}$" thick sheet steel.

Attached to the posts 54 and joined at opposite ends to the door post 12 and the corner post 17 is a wall plate 51 which is secured by vertical weldments 52—52 (FIG. 3) to the out-turned flanges 53. The wall plate 51 and the posts 54 combine to provide one of the interior walls of the freight car.

Figure 3:
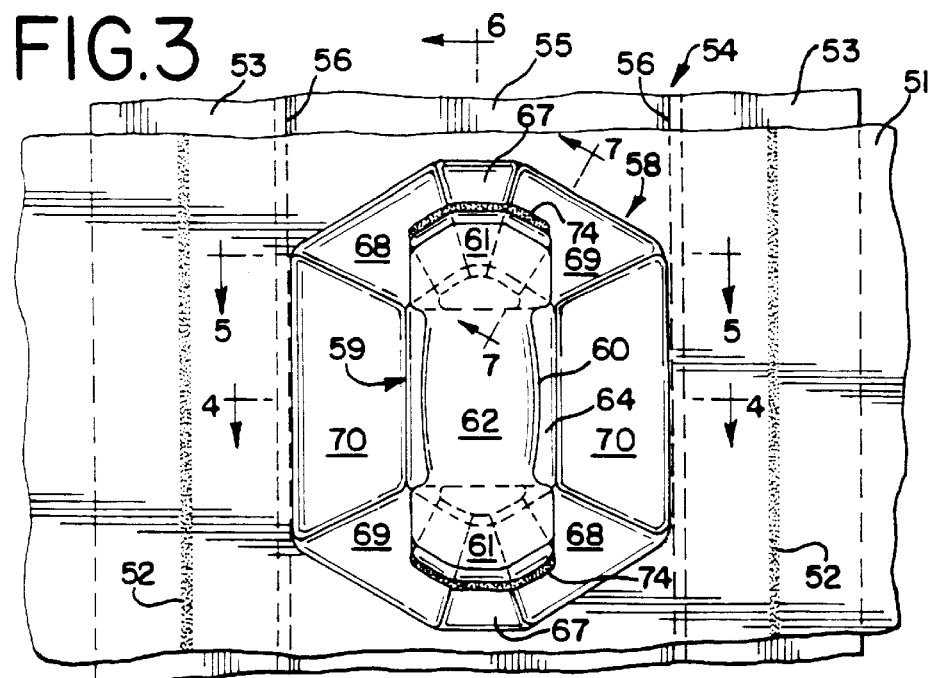
FIG. 3 is a fragmentary view in front elevation and on enlarged scale showing one of the lading tie anchors in the car side wall of FIG. 1.
Figure 6:
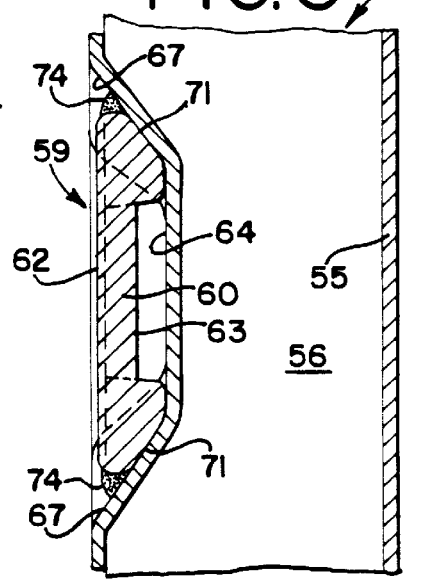
FIGS. 5, 6 and 7 are sectional views taken generally on lines 5—5, 6—6, 7—7 of FIG. 3.
Figure 5:
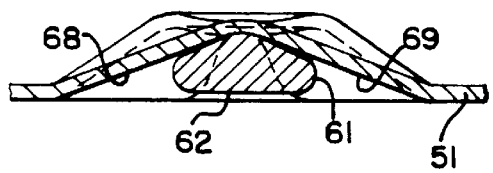
Figure 7:
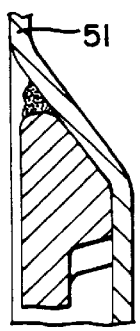

In those portions of the wall plate 51 that overlie a post channel 57 (FIG. 4) defined by the rear wall 55 and side walls 56 of each side post 54 vertical strips or rows of generally hexagonal deformed sections are formed in known manner in the wall plate 51 by a suitable die, one such hexagonal deformed section being indicated generally at 58 (FIG. 3). The deformed sections 58 are provided in order to receive metallic lading tie anchors, the one shown in FIGS. 3–7 being indicated generally at 59. Each lading tie anchor 59 includes an intermediate uninterrupted lading tie-receiving section 60 having integral end portions 61—61. The outer surface 62 of each lading tie anchor 59 is flush with, or slightly inset from the plane of the outer surface of the wall plate 51 surrounding the deformed section 58. The under surface 63 (FIGS. 4 and 6) of the mid-portion 60 of each lading tie anchor 59 is spaced as shown from the flat bottom surface 64 of the deformed section 58, in order to receive the hook 32 (FIG. 8) on the end of a lading tie.

It is desirable that the configuration of the deformed section 58 be such that each lading tie anchor 59 when positioned therein, is automatically properly positioned for subsequent welding in place without requiring the use of special jigs. For a further description of the details of the configuration of the deformed section 58 reference may had to U.S. Pat. No. 3,179,068 dated Apr. 20, 1965 the disclosure of which is incorporated herein by reference. In particular reference is made to FIGS. 14–18 of U.S. Pat. No. 3,179,068 and the accompanying description as set forth in lines 5–28 of column 5 of that patent.

As evident from those patents, and as shown in present FIGS. 3, 4, 5 and 6, the deformed section 58 is provided with wedge shaped end surfaces 67 that are inclined from the outer surface of the wall plate 51 toward the flat bottom surface of the wall plate 51 toward the flat bottom surface 64. The wedge shaped end surfaces 67 are flanked by wedge shaped surfaces 68 and 69. The wedge shaped surfaces 68 and 69 are inclined. Wedge shaped end surfaces 71 of this illustrated structure are formed on the under sides of the end portions 61 and are inclined to correspond to the inclination of the wedge shaped end surfaces 67. The lading tie bar 59 is positioned with respect to the defromed section 58, with illustrated weld metal 74 being shown for securely holding the lading tie bar 59.

As indicated above there are many railway box cars that have been built and which are still in service having lading tie anchors constructed in their interior side walls which are the same or similar to the lading tie anchors described above in connection with FIGS. 1–7, and which have been used with lading ties in the form of steel strapping. As mentioned above, such strapping is objectionable for several reasons. It has to be applied with special tools and thereafter removed after each use, and upon removal becomes scrap creating a disposal problem. Further, since the steel strapping has to have tight engagement with the cargo, the sharp edges of the strapping have a tendency to abrade or cut into and damage the exterior surfaces of the cargo or lading being restrained.

According to the present invention lading ties of a different nature and construction are installed in box cars, permanently if desired, which are capable of repeated use over extended periods of time. Further, when formed of woven webbing such as polyester the ties used in the present invention have little or no tendency to abrade or cut into the surfaces of the cargo with which they are engaged. Referring to FIG. 8 such a lading tie is indicated generally at 30 comprising a strip of woven webbing 33 having a hook 32 attached to one end and a protective fitting 35 on its other end. The webbing is doubled over and stitched at the end attached to the hook 32 as indicated by the broken lines.

Referring to FIGS. 9 and 10 the unanchored ends of a pair of lading ties indicated generally therein at 30 and 31 are shown together with a slack take-up buckle indicated generally at 34 forming a complete lading tie extending between lading tie anchors in opposing car side walls 10 in accordance with the present invention. The buckle 34 is of known commercial type suitably modified for purpose of the present invention. The buckle 34 is made by the Kinedyne Corp., 3701 Greenway Circle, Lawrence, Kan., model P/N 804. It includes a ratchet 41 and an operating handle 37. At the end opposite the ratchet 41 the buckle has a pair of rollers 38 and 39 which are mounted between support arms 40—40.

In use, the hooks 32 on a pair of ties 30–31 are inserted in lading tie anchors such as those shown and described in connection with FIGS. 1–7 located in opposing walls of a rail car. The free end of one lading tie 30 is inserted and secured in the ratchet 41 of a buckle 34. The free end of the other tie 31 is threaded around the rollers 38 and 39 as best shown in FIG. 11. The free end 42 of the tie 31 threaded around the rollers 38 and 39 is pulled taut so as to take up most of the slack in the ties 30 and 31. Thereafter, the handle 37 is lifted and swung counter clockwise as indicated by arrow A in FIG. 10 so as to operate the ratchet 41 and take up any remaining slack in the ties 30 and 31 and then apply the desired tension on the ties. The handle 37 is then stored in its lowered position as shown in FIGS. 9 and 10.

Referring to FIG. 14, five pairs of buckled together lading ties 30–31 are shown in restraining engagement with rolls of paper indicated generally at 36 standing on end on the floor of a railway box car equipped with lading tie anchors in the side walls as described above in connection with FIGS. 1–7. It will be understood that when the lading ties 30 and 31 are not in use they can either be removed for further use, allowed to hang freely from the lading tie anchors to which their hooks 32 are attached, or they may be supported in a suitable manner for re-use as shown in FIGS. 15–17. Therein the door post 12 (FIGS. 1 and 2) is shown with a lading tie anchor strip 48 of the type shown and described in Jensen patent 4,266,897 dated May 12, 1981 the disclosure of which is incorporated by reference herein. The strip 48 includes a plurality of lading tie anchors indicated generally at 43 each of which includes a curved wall recess 44 (FIG. 17) and a lading tie bar 45. Preferably, the lading tie bars 45 are vertically spaced the same distance as the lading tie bars 59 (FIG. 3).

As shown in FIGS. 15–17 a web support clip 46 is inserted in each of the lading tie anchors 43 between the recesses 44 and the tie bars 45. The clips 46 may be formed of plastic, cardboard or compressed wood particles. Each clip 46 includes an elongated portion which fits under a tie bar and a head portion with an upwardly opening slot 47 (FIGS. 15 and 16) in which a tie is supported. Each clip 46 is formed with a notch 49 in the underside which catches on an adjacent corner on the strip 48 and assists in preventing the clip from being pulled out. In order to take advantage of the notch 49 each clip is tilted down when inserted as shown in FIG. 16. The clips are particularly useful in preparing a box car for loading since they provide a handy means of storing the ties 30–31 until loading has been completed. It will be seen that the clips 46 can also be inserted in the lading tie anchors 59 if desired.

Referring to FIGS. 12 and 13, one of the hooks 32 on the end of one of the lading ties 30–31 is shown coupled to the lading tie bar 59 of a lading tie anchor in the car side wall construction 10 of FIGS. 1 and 2. The hook 32 can be in the form of a casting, forging or stamping and will have a hook portion 20 at one end and a web-receiving slot 21 in the opposite end. A resilient retainer 22 in the form of a shaped block of rubber or similar resilient material, or a spring clip is riveted at 23 to the hook 32. As will be seen in FIG. 13 the hook 32 is formed with an integral arcuate embossment 24 which engages the surface 70 when the hook is pivoted upwardly thereby camming or forcing the hook against the lading tie anchor 59. This engagement and the prongs 25 on the rubber retainer 22 prevent the hook 32 from becoming unintentionally separated from a lading tie anchor. Thus, the resilient retainer 22 serves to keep the hook 32 permanently attached to a lading tie anchor in the wall 10 until such time as it is desired to intentionally remove it. If the resilient retainer 22 on the hook 32 is lost, the embossment will usually keep the hook in place.

The solt 21 in the hook 32 allows the end of a webbing strap 32 to loop around the wide end of the hook and be suitably secured by being folded on itself and stitched together as shown.

What is claimed is:

1. A lading tie anchor system for a box car having a pluarality of vertical rows of lading tie anchors installed in opposing side walls with each said row incorporating a plurality of vertically spaced lading tie anchros for use with steel strap lading ties which become scrap after one use, comprising:

a plurality of vertically spaced pairs of re-useable lading ties with each tie in each pair having one end anchored to one of said lading tie anchors on one wall which is opposed to another of said lading tie anchors on the opposite wall, a buckle releasably securing together the unanchored ends of each said pair of ties in restraining engagement with lading, at least one of said re-usable lading ties has a hook secured to one end, which hook is releasably hookable to one of said lading tie anchors, and said hook has a rigid hook body with a hook formation at one end and a resilient retainer on the hook body for resiliently engaging a respective said anchor and for retaining said hook to said loading tie anchor.

2. The lading tie anchor system of claim 1 wherein said buckle is a slack take-up and tensioning buckle which is adapted to first take up any slack in the joined lading ties and then to tension the joined lading ties against the lading.

3. In the lading tie anchor system of claim 1 each of said lading ties comprising a strap of webbing attached to said hook on one end.

4. In the lading tie anchor system of claim 3 each said strap of webbing being formed primarily of polyester.

5. In the lading tie anchor system of claim 1 the unanchored end of each of said lading ties in each said pair thereof being adjustably attached to said buckle whereby said buckle can be shifted to different positions between a pair of said lading tie anchors.

6. In the lading tie anchor system of claim 1 the unanchored end of one of said lading ties in each said pair thereof being non-adjustably attached to said buckle while the unanchored end of the other respective lading tie of said pair is adjustably attached to said buckle.

7. In the lading tie anchor system of claim 1, a plurality of vertical posts in each side wall onto which posts a wall plate is mounted and into which wall plate said plurality of vertical rows of lading tie anchors are formed.

8. The lading tie anchor system of claim 1 wherein said buckle has a handle-operated ratchet on one end of the buckle and a pair of anchor tie strap take-up rollers on the opposite end.

9. In the lading tie anchor system of claim 1, wherein said resilient retainer is a shaped block of resilient material.

10. In the lading tie anchor system of claim 1, wherein said resilient retainer is a spring clip.

11. A lading tie anchor system for a box car having a plurality of vertical rows of lading tie anchors installed in opposing side walls with each said row incorporating a plurality of vertically spaced lading tie anchors for use with steel strap lading ties which become scrap after one use, a plurality of vertically spaced pairs of re-useable lading ties with each tie in each pair having one end anchored to one of said lading tie anchors on one wall which is opposed to another of said lading tie anchors on the opposite wall, and a buckle releasably securing together the unanchored ends of each said pair of ties in restraining engagement with lading, wherein each said re-usable lading tie comprises an elongated strap with a lading tie anchor engaging hook on one end and wherein a plurality of strap supporting clips are removably inserted into a plurality of said lading tie anchors for temporarily supporting the straps of a plurality of said lading ties, the hooks of which are engaged in a corresponding plurality of said lading tie anchors.

12. In the lading tie anchor system of claim 1, wherein said resilient retainer includes a prong.

13. In the lading the anchor system of claim 1, wherein said hook has an embossment thereon which co-acts with said resilient retainer to retain said hook to said lading tie anchor.

14. A lading tie anchor system for a box car having a plurality of vertical rows of lading tie anchors installed in opposing side walls with each said row incorporating a plurality of vertically spaced lading tie anchors for use with steel strap lading ties which become scrap after one use, a plurality of vertically spaced pairs of re-useable lading ties with each tie in each pair having one end anchored to one of said lading tie anchors on one wall which is opposed to another of said lading tie anchors on the opposite wall, and a buckle releasably securing together the unanchored ends of each said pair of ties in restraining engagement with lading, wherein at least one of said re-usable lading ties has a hook attached to one end, said hook having a rigid hook body with a hook formation at one end and a resilient member fastened to an inner side of the hook body for resiliently engaging a respective said anchor, and said hook has an exterior embossment thereon which co-acts with said resilient member to retain said hook hooked to said lading tie anchor.

15. The lading tie anchor system of claim 14 wherein said resilient member is a body of rubber-like material.

16. A lading tie anchor system for a box car having a plurality of vertical rows of lading tie anchors installed in opposing side walls with each said row incorporating a plurality of vertically spaced lading tie anchors for use with steel strap lading ties which become scrap after one use, comprising:

plurality of vertically spaced pairs of re-useable lading ties with each tie in each pair having one end anchored to one of said lading tie anchors on one wall which is opposed to another of said lading tie anchors on the opposite wall, a buckle releasably securing together the unanchored ends of each said pair of ties in restraining engagement with lading, at least one of said re-usable lading ties has a hook secured to one end, which hook is releasably hookable to one of said lading tie anchors, and said hook has a rigid hook body with a hook formation at one end, with an embossment having a protruding portion which engages a respective said lading tie anchor to retain said hook to said lading tie anchor.

17. In the lading tie anchor system of claim 16, wherein said hook includes a resilient retainer at a location spaced apart from said embossment, which resilient retainer engages said respective anchor to assist in retaining said hook to said anchor.

18. In the lading tie anchor system of claim 17, wherein said resilient retainer is a shaped block of resilient material.

19. In the lading tie anchor system of claim 17, wherein said resilient retainer is a spring clip.

20. In the lading tie anchor system of claim 17, wherein said resilient retainer includes a prong.

* * * * *

UNITED STATES PATENT AND TRADEMARK OFFICE
CERTIFICATE OF CORRECTION

PATENT NO.   : 6,402,446 B1  Page 1 of 1
DATED        : June 11, 2002
INVENTOR(S)  : Nadherny et al.

It is certified that error appears in the above-identified patent and that said Letters Patent is hereby corrected as shown below:

<u>Title page,</u>
Item [57], ABSTRACT,
Line 7, after "In addition to the novel lading ties" insert -- , --.

<u>Column 2,</u>
Line 30, after "overlie" insert -- the --.
Line 47, after "post 54" insert -- , --.

<u>Column 3,</u>
Line 7, delete "those patents" and insert -- this patent --.
Line 18, delete "defromed" and insert -- deformed --.
Line 39, after "polyester" insert -- , --.

<u>Column 4,</u>
Line 35, after "notch 49" insert -- , --.
Line 62, delete "strap 32" and insert -- strap 33 --.

<u>Column 5,</u>
Line 2, delete "anchros" and insert -- anchors --.
Line 25, after "claim 1" insert -- , --.
Line 28, after "claim 3" insert -- , --.
Line 30, after "claim 1" insert -- , --.
Line 35, after "claim 1" insert -- , --.

<u>Column 6,</u>
Line 7, delete "lading the anchor" and insert -- lading tie anchor --.
Line 37, before "plurality" insert -- a --.

Signed and Sealed this

Twenty-sixth Day of November, 2002

*Attest:*

*Attesting Officer*

JAMES E. ROGAN
*Director of the United States Patent and Trademark Office*